UNITED STATES PATENT OFFICE.

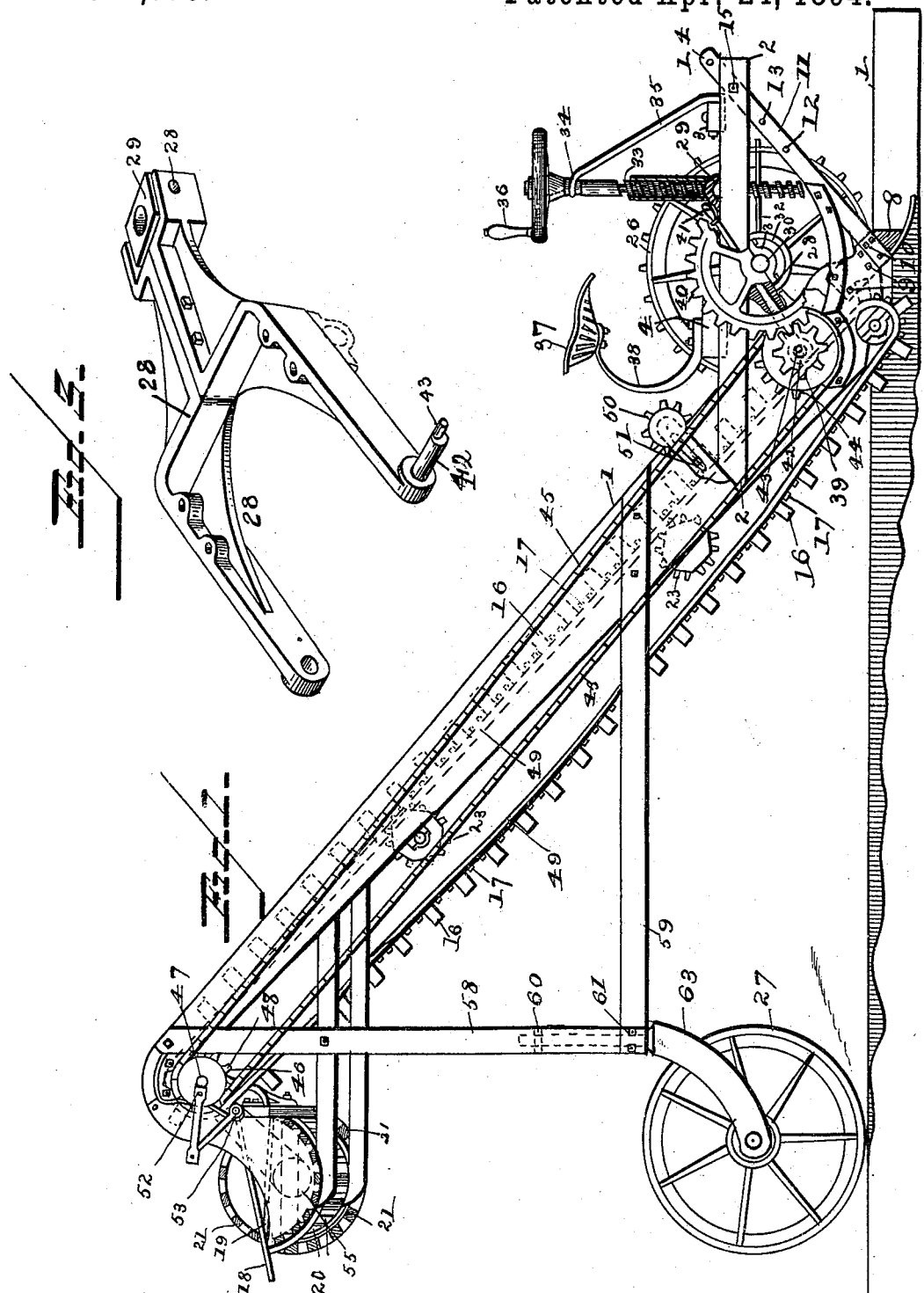

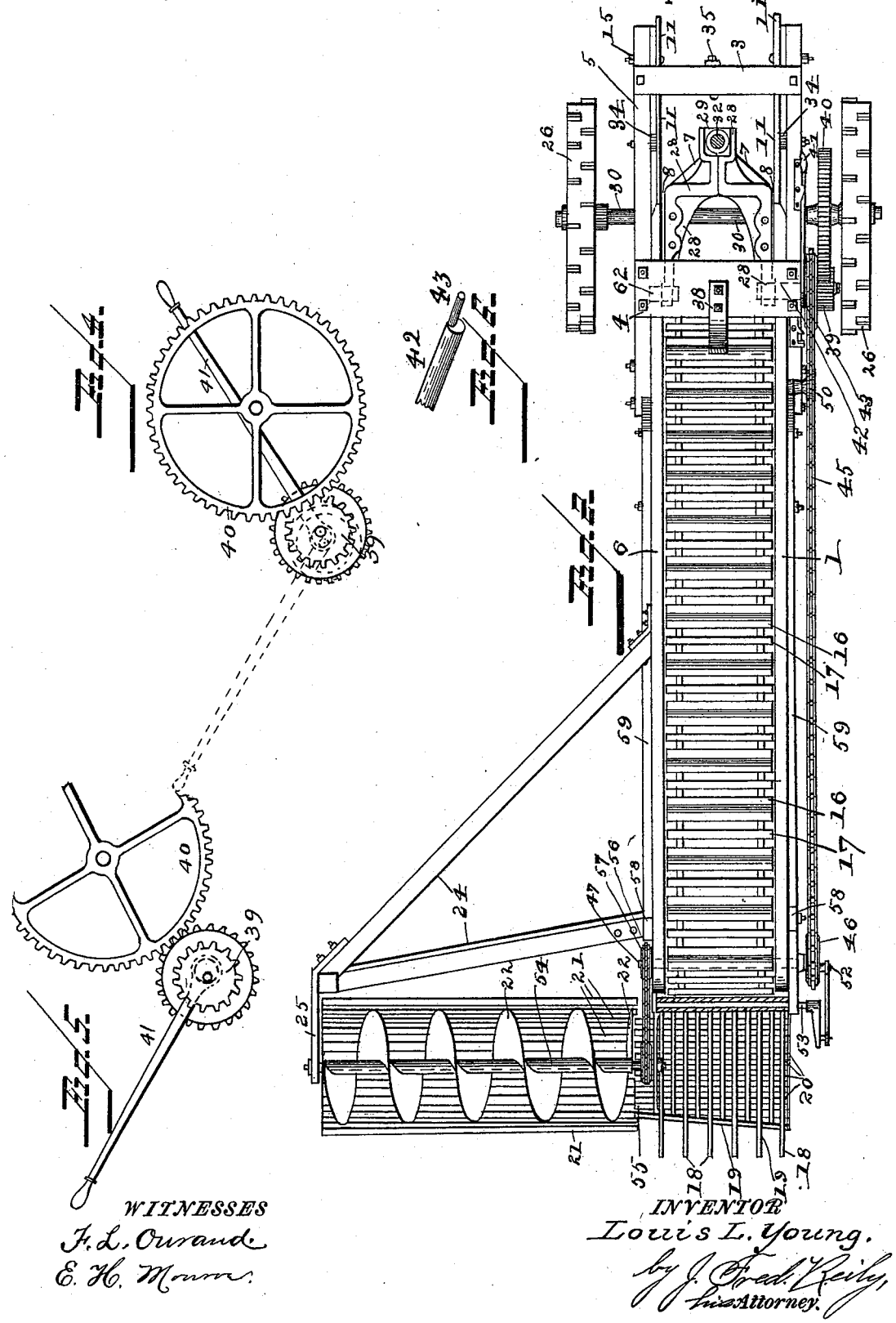

LOUIS L. YOUNG, OF ST. JOSEPH, MISSOURI.

POTATO-HARVESTER.

SPECIFICATION forming part of Letters Patent No. 518,770, dated April 24, 1894.

Application filed May 15, 1893. Serial No. 474,311. (No model.)

*To all whom it may concern:*

Be it known that I, LOUIS L. YOUNG, a citizen of the United States, residing near St. Joseph, in the county of Buchanan and State of Missouri, have invented certain new and useful Improvements in Potato-Harvesters, of which the following is a specification.

My invention consists in a potato harvester which is designed to dig the potatoes from the ground, to separate them from the dirt, weeds, grass, vines, &c., and to deposit them in a vehicle at one side of the harvester; and the invention will be hereinafter fully described and claimed.

Referring to the accompanying drawings, Figure 1 is a side elevation of my potato harvester, with some of the parts broken away to better illustrate the construction. Fig. 2 is a top plan view, with some of the parts broken away, as hereinafter described. Fig. 3 is a detail view of the yoke-lever, 28. Figs. 4, 5, and 6, are detail views, hereinafter referred to.

The objects of my invention are, first, to provide a machine which will dig and separate the potatoes from the earth, weeds, grass, vines, &c., and deposit them when thus separated in a suitable vehicle at one side of the machine; second, to so construct said machine that it will dig and separate the potatoes thoroughly without becoming clogged by the earth, weeds, &c.; third, to so construct said machine that it will be light of draft, and may be easily and quickly adjusted to any depth of furrow, by the one simple movement of turning a hand-wheel, or its blade may be thus raised above the ground when driving on the road; and fourth, to so construct said machine that it shall be simple, strong, and durable, and not liable to get out of order. I attain these objects by the following construction.

My invention consists broadly of five parts; viz: the plow, the elevator, the weed and vine separator, the upper inclined trough, and the revolving or "tumbling" cylinder, which thoroughly separates the earth from the potatoes, and delivers them in a cleaned condition into a vehicle at the side of the machine.

Referring to the several parts by their designating numerals, the same numerals of reference indicating corresponding parts in all the figures, the inclined side-pieces 1 and 6, the horizontal timbers 2 and 5, and the transverse bars 3 and 4 bolted upon said horizontal timbers, form the main frame-work of the machine. At the lower ends of the side-pieces 1 and 6 is secured the digging blade or plow, 7 indicating its inclined and tapering point, and 8, 8, its vertical sides, which are secured to the lower ends of parts 1 and 6 by the bolts 9. The front edges of the vertical sides 8 of the plow-blade are sharpened, forming cutting edges which assist in cutting the furrow. To the sides 8 of the plow are also secured by bolts 10 the lower ends of two inclined draft- and bracing- bars, 11, 11; the upper ends of which are bolted to the frame-pieces 2, 5, and said bars are formed with a series of openings 12, 13, 14, by which construction the horses may be attached to said draft-bars at various heights, as may be desired. Rotary cutting disks, of the well-known construction, may also be attached to the bars 11 to assist in cutting the sides of the furrow.

The potatoes, earth, &c., pass over the blade of the plow and between its sides 8 and upon the lower end of the elevator, which is formed of two sprocket-chains 49, 49, which pass around sprocket pinions 15 at the lower end of the elevator, and at its upper end pass around two sprocket-wheels 48 on the shaft 47, which is mounted transversely in bearings at the upper end of the frame-pieces 1 and 6. Upon these sprocket-chains are secured transversely the series of high, projecting, slats 16 and low slats 17, which are arranged alternately as shown, preferably two of the low slats between each pair of projecting or elevated slats. These elevated slats serve to hold the potatoes, &c., in place on the endless carrier, preventing their slipping down upon the same. The elevator is operated by a sprocket-chain, 45, which passes at its lower end around a sprocket-wheel 44, which is driven as hereinafter described, and at its upper end around a sprocket-wheel 46 on one end of the shaft 47 which carries the two wheels 48 around which the elevator-chains 49 pass. The potatoes, earth, &c., fall over the upper end of the elevator through the inclined finger-bars 18 and 19 into the inclined trough 20, which is formed of slats as shown, with spaces left between them; said inclined trough being supported upon the frame-bars 58ª.

The stationary finger-bars 19 are inclined inwardly, while the upper finger-bars, which are longer and are inclined downward toward their outer free ends, are secured at their inner ends to an oscillating shaft, 53, the cranked outer end of which is pivotally connected by a pitman, 52, to a wrist-pin 52ª on the sprocket-wheel 46. It will be seen that as the sprocket-wheel 46 is revolved, the shaft 53 will be rocked in its bearings, thus oscillating the finger bars 18, giving them an up and down movement at their free outer ends.

As the potatoes are carried up by the elevator, part of the earth will be sifted through the spaces between the slats of the elevator; which is assisted by the vibration imparted to the slatted carrier by the two pairs of seven-sided sprocket-wheels 23, which are mounted on transverse shafts, and over which the chains of the elevator pass. When the potatoes drop upon and through the finger-bars 18 and 19, the weeds, vines, &c., will gravitate down the downwardly-inclined upper fingers as the latter are vibrated, and will fall to the ground from the outer ends of said fingers, behind the machine. The potatoes will be separated from the earth and any clods or lumps of the latter broken up as they pass through the oscillating fingers 18 and stationary fingers 19, into the inclined slatted trough 20; and as they gravitate down said trough the earth will sift through said slatted trough. The separation of the potatoes and loose earth is completed by the slatted tumbling cylinder 21. This cylinder is formed of parallel slats, with spaces left between them, a central shaft, 54, and a "worm," or wide spiral flange, 22, which is secured to the shaft 54 at its inner edge and is of such width that its outer edge is in contact with the slats 21, which are secured to said outer edge. The outer end of the tumbling cylinder is supported by the braces 24 and 25, and the inner end of the shaft 54 is mounted in a bracket 25ª. The cylinder is rotated by a sprocket-chain, 56, which passes around a sprocket-wheel, 57, on that end of the shaft 47 and a similar wheel 55 on the inner end of shaft 54. It will be seen that as this cylinder is revolved, and the potatoes are carried through it by the "worm" or spiral flange, the separation of the loose earth, (which will be sifted out through the slatted tumbling cylinder,) from the potatoes will be effectually completed, and that the potatoes will be thoroughly clean and free from dirt, weeds, &c., when they are finally discharged from the outer end of the tumbling cylinder into the vehicle at one side of the machine.

The rear end of the machine is supported upon a caster-wheel, 27, the stem of its bracket 63 passing through bearings, 61, 60, of the frame 58, 59. The front end of my harvester is supported on the main wheels 26, 26, which are loosely mounted on the ends of the straight axle 30, and revolve the same as the machine is drawn forward, through the well-known device of having pivoted pawls which engage with the inclined teeth of ratchet-wheels on the axles, when the main wheels are turning forward, but which slip over said inclined teeth when either wheel turns backward, as in backing the machine or in turning at the end of the field; thereby preventing the several operative parts being turned in the wrong direction. The axle 30 is mounted and turns in boxings 31 on the under side of a yoke-lever, 28, the inner ends of which are pivotally secured on pivot-bolts 62, 42, extending from the side timbers 1, 6. In the bifurcated outer end of this yoke-lever is pivoted, by side-pintles 29ª, the lower end of an upright sleeve, 29; the upper end of which is threaded interiorly to adapt it to be engaged by the adjusting screw 33. This heavy adjusting screw is reduced at its upper end where it passes through the apertured upper ends of metal braces 34, 35, 34, secured to the front and side timbers 3, 2, and 5, as shown; and a hand-wheel, 36, is secured upon the upper end of this screw, by means of which it can be readily and instantly turned. It will now be seen that the driver, sitting in the seat 37 which is supported on spring 38, can by turning the hand-wheel 36 force downward the outer end of the yoke-lever 28, (the braces 34, 35, preventing the screw from rising) and can thus lift the plow out of the ground; this construction enabling the driver to easily and quickly adjust the depth of the plow to any depth of furrow, or to raise the plow entirely above the ground when traveling on the road.

The outer end of the right-hand pivot-bolt 42 is formed with an eccentric pivot-pin or wrist-pin 43, upon which is loosely mounted the sprocket-wheel 44, around which the lower part of the drive-chain 45 passes, and a sprocket-pinion, 39, which is bolted to the outer side of sprocket-wheel 44. A hand lever, 41, is secured at its inner end on the outer part of pivot-bolt 42, and it will be seen that when the handle of this lever is pushed forward, as shown in Figs. 1 and 2, it will turn the pivot-bolt 42 to cause the pinion 39 on its eccentric pivot-pin to mesh with a large gear-wheel 40 which is keyed on that end of the revolving axle 30. As this loosely mounted pinion is bolted or otherwise attached to the sprocket-wheel 44, it will be seen that when the machine is driven forward and the lever 41 is moved forward to throw pinion 39 into engagement with gear-wheel 40, the wheel 44 will thus be revolved through the gear-wheel and pinion, and the operative parts of the machine be set in motion as before described.

Any slack which may occur in the drive sprocket chain 45 is taken up by adjusting the sprocket tension-wheel 50, which is pivoted on the outer side of the upper end of an adjustable arm or standard, 50ª. This standard is formed with a longitudinal slot, 50ᵇ, and is arranged as shown on the outer side of timber 1, where it is adjustably held by the pressure of a nut, 51, on the outer end of a bolt 51ª, which passes through its slot.

It will be seen that the elevator, 49, 16, 17, of my invention is a great improvement over those harvesters in which the potatoes, immediately after being dug, pass directly from the plow into tumbling cylinders or are dragged up inclined planes, as such treatment will rub off the skin and bruise the potatoes, which are a very tender vegetable, and thus render them unfit for storage. My elevator, however, with its low lateral slats 17 and high lateral slats 16, literally carry the vegetables, and prevent any bruising or other injury.

Having thus described my invention, what I claim, and desire to secure by Letters Patent, is—

1. A potato harvester comprising a plow, an elevator, a separator designed to remove the vines and weeds from the earth and potatoes and arranged at the upper end of said elevator, an inclined slatted trough arranged beneath said separator, and a slatted revolving cylinder arranged to deliver the cleaned potatoes at one side of the elevator; substantially at set forth.

2. In a potato harvester, the combination of a plow, an elevator, the inclined slatted trough, the inclined oscillating finger bars, and a revolving slatted cylinder at the outer end of said trough; substantially as set forth.

3. In a potato harvester, the combination of a plow, an elevator, the inclined slatted trough, the inclined stationary finger bars, the inclined oscillating finger bars, and a revolving slatted cylinder at the outer end of said trough; substantially as set forth.

4. In a potato harvester, the combination with a plow, an elevator, and an inclined trough, of the revolving cylinder formed with the slatted sides, the central shaft, and the interior wide spiral flange or "worm" extending from the central shaft to the slatted sides of the cylinder, substantially as and for the purpose set forth.

5. In a potato harvester, the combination, with the inclined frame carrying the plow at its lower end, and the fixed horizontal frame, of the yoke-lever pivotally secured to the lower end of the inclined frame at its inner end, having the axle 30 mounted in bearings centrally on its under side, and having pivoted in its recessed outer end the threaded sleeve, and the adjusting screw working through said threaded sleeve, having the braces 34, 35, to prevent it from rising, and having a suitable crank or hand-wheel on its upper end; substantially as set forth.

6. In a potato harvester, the combination with the revolving axle having the large gear wheel 40 secured thereon, of the pivoted bolt 42 having its outer end formed into the eccentric pivot pin 43, the sprocket wheel 44, around which the drive chain of the harvester passes, loosely mounted on said eccentric pivot-pin 43, and having secured to its outer side a sprocket pinion adapted to mesh with the gear wheel 40, and a hand lever secured at its inner end to the pivot bolt 42 and adapted to turn the same, substantially as and for the purpose set forth.

In testimony whereof I affix my signature in presence of two witnesses.

LOUIS L. YOUNG.

Witnesses:
GEORGE W. HINTON,
FRANK B. SCHNEIDER.